(12) United States Patent
Lehmann

(10) Patent No.: US 7,993,139 B2
(45) Date of Patent: Aug. 9, 2011

(54) TEACHING AID AND METHOD OF TEACHING A LEARNER WRITING SKILLS

(76) Inventor: Jennifer Lehmann, Metairie, LA (US)

( * ) Notice: Subject to any disclaimer, the term of this patent is extended or adjusted under 35 U.S.C. 154(b) by 141 days.

(21) Appl. No.: 12/386,922

(22) Filed: Apr. 24, 2009

(65) Prior Publication Data

US 2010/0273133 A1  Oct. 28, 2010

(51) Int. Cl.
*G09B 1/00* (2006.01)
(52) U.S. Cl. ........................................................ 434/160
(58) Field of Classification Search .................. 434/156, 434/159, 160, 162, 163, 164, 165, 170, 172, 434/176
See application file for complete search history.

(56) References Cited

U.S. PATENT DOCUMENTS

| | | | | |
|---|---|---|---|---|
| 713,638 A * | 11/1902 | Hepfinger | | 434/160 |
| 2,445,421 A * | 7/1948 | Davis | | 273/157 R |
| 2,682,118 A * | 6/1954 | Larsen | | 434/160 |
| 2,693,963 A * | 11/1954 | Moscato | | 273/157 R |
| 2,848,823 A * | 8/1958 | Washburn | | 434/170 |
| 3,075,304 A * | 1/1963 | Votolato | | 434/160 |
| 3,526,975 A * | 9/1970 | Reeves | | 434/164 |
| 3,774,319 A * | 11/1973 | Sprowls | | 434/164 |
| 3,869,813 A * | 3/1975 | Hancy | | 434/163 |
| 4,344,626 A * | 8/1982 | Wadland | | 273/243 |
| 4,998,883 A * | 3/1991 | Brinkley | | 434/159 |
| 5,074,794 A * | 12/1991 | Von Hagen | | 434/193 |
| D360,238 S * | 7/1995 | Figone et al. | | D21/479 |
| 5,980,354 A * | 11/1999 | Prest | | 446/227 |
| 6,050,824 A * | 4/2000 | Stuart | | 434/159 |
| D428,074 S * | 7/2000 | Bitton et al. | | D21/480 |
| 6,626,678 B2 * | 9/2003 | Forbes et al. | | 434/247 |
| 2003/0162153 A1* | 8/2003 | Mohn et al. | | 434/162 |

* cited by examiner

*Primary Examiner* — Kurt Fernstrom
(74) *Attorney, Agent, or Firm* — Keaty Law Firm LLC

(57) ABSTRACT

A system for teaching learners to write letters of an alphabet uses a plurality of template blocks, each having a cutout corresponding to a letter of the alphabet. A bottom wall of the cutout is covered with an abrasive material to facilitate tactile recognition of the letter shape by the learner. The kit has a plurality of insert members that make letter-forming components, such that one or more insert members fitted in the cutout form the corresponding letter of the alphabet.

15 Claims, 5 Drawing Sheets

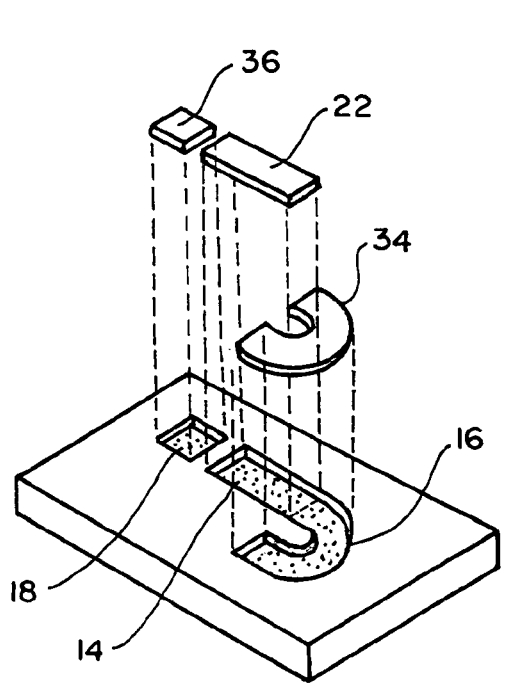
F I G. 1
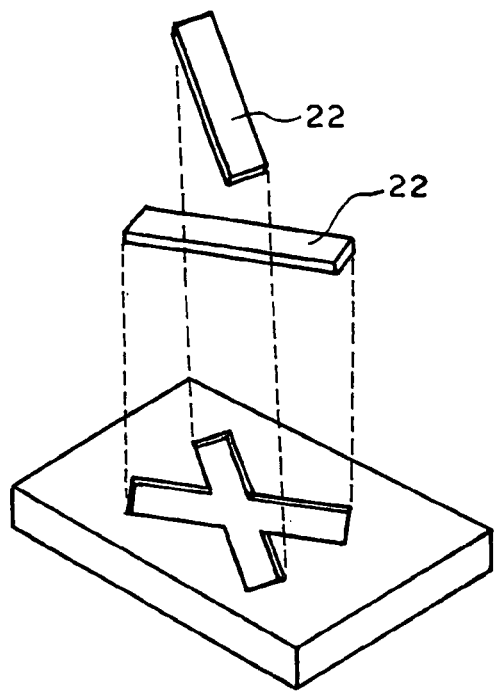
F I G. 3
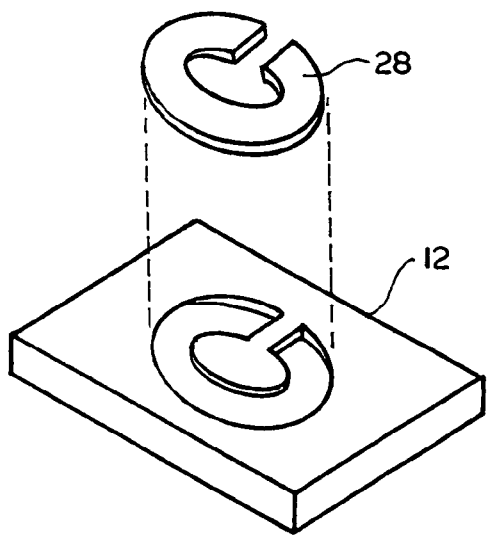
F I G. 2
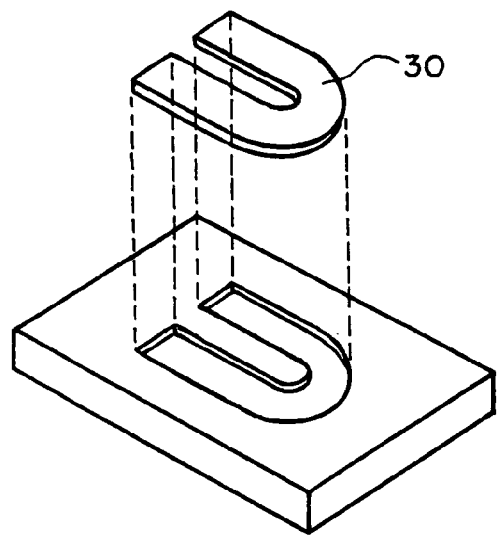
F I G. 4

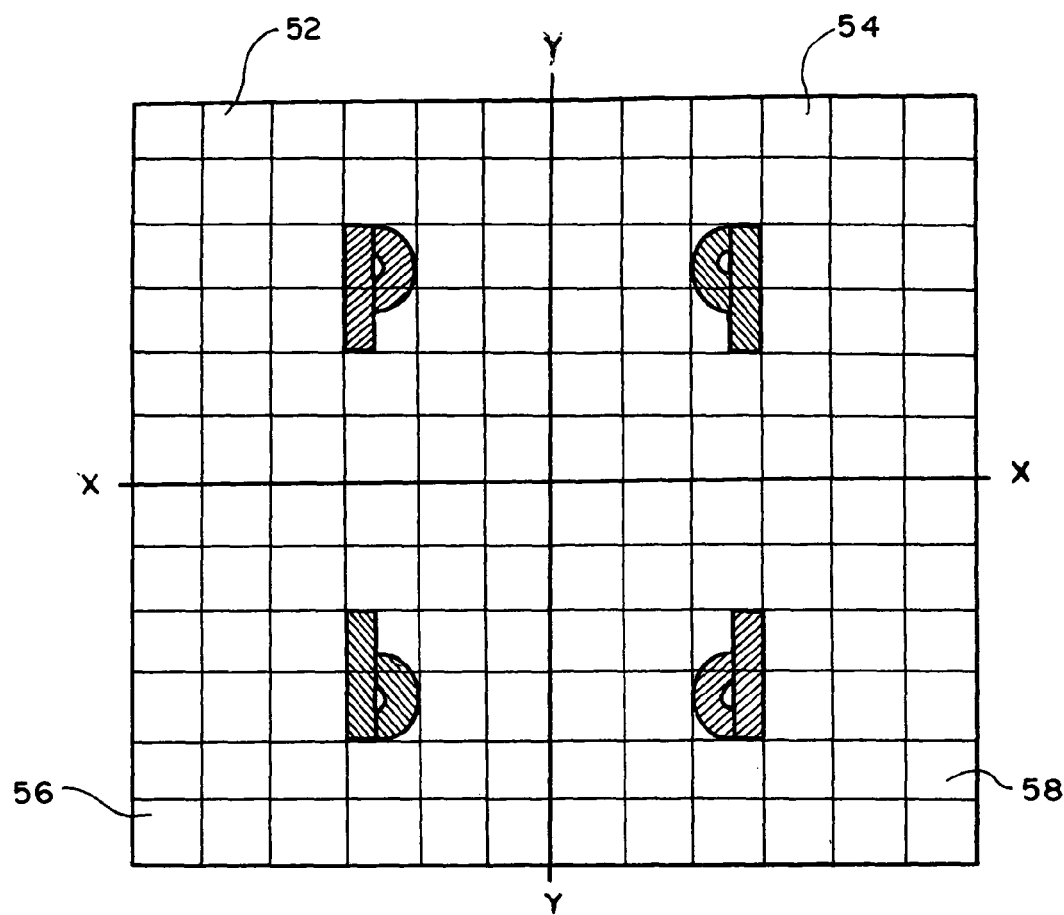
F I G. 8
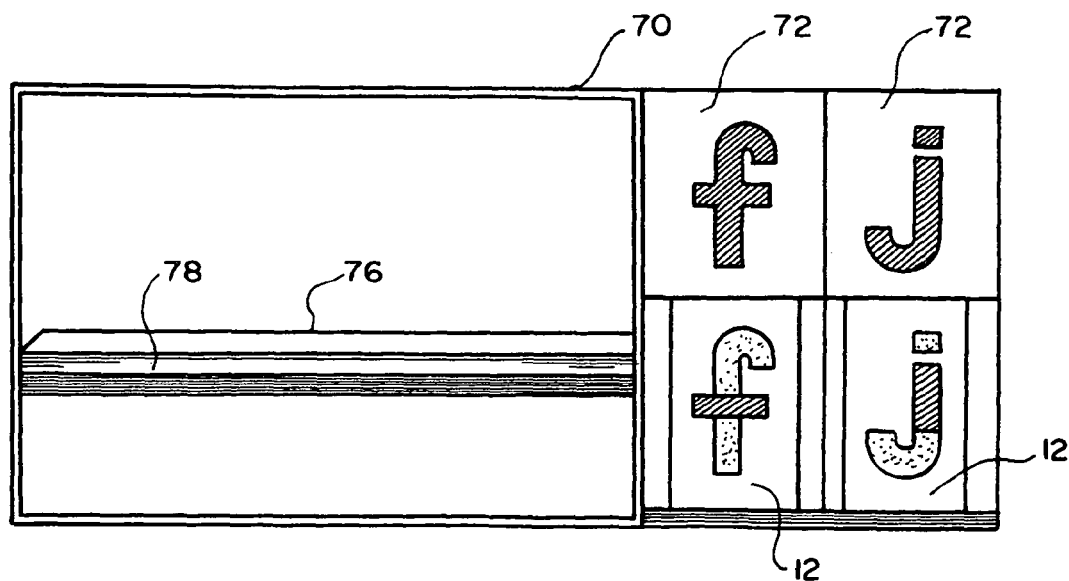
F I G. 9

TEACHING AID AND METHOD OF TEACHING A LEARNER WRITING SKILLS

BACKGROUND OF THE INVENTION

The present invention relates to a teaching aid apparatus and method and, more particularly, to a teaching aid and method to assist students in developing writing skills while learning the alphabet.

In today's public schools, students and teachers are under constant pressure to perform well on standardized tests. Due to the No Child Left Behind Act (NCLB, 2001), students are required to meet a set standard or benchmark for achievement. Students who do not succeed in meeting this standard are recommended for remediation, specialized services, or retention. Teachers whose students do not meet this standard, are held accountable for their students' performances, due to their own teaching practices. As this pressure to teach more and more information in a single school year grows, students cannot afford to fall behind.

While public school teachers are obligated by contract to teach the curriculum set by the state, they are also obligated to meet the needs each individual student. Students are unique individuals, with different interests, initial skills, strengths, weaknesses, and learning modalities. Not every student learns the same way as their peers, and teachers need to recognize and embrace these differences in their students.

According to the Dynamic Indicators of Basic Early Literacy Skills Program (DIBELS, 2003), the end of kindergarten benchmark requires children to be able to read nonsense words at a rate of 25 correct sounds in one minute and have a letter naming fluency of 40 correct letter names read in one minute in order to be in the "low risk" category. Children are also expected to enter first grade reading approximately 40-50 high frequency words and be able to decode regular Consonant-Vowel-Consonant words. It is generally recognized that readers who are unable to recognize letters, choose not to read at all.

Students who do not have these basic skills become labored readers and can be labeled as at-risk. At-risk readers tend to be frustrated with reading, read below-grade level, and in some cases get "stuck" in a lower component of Reading First (2003). Since Reading First (2003) components build on one another, a child that is struggling with phonemic awareness does not have the skills to build these letters into phonological words, which in turn, would lead to fluency, building vocabulary, and comprehension in reading. If comprehension is the highest level of understanding text, a child with low letter recognition skills will be limited in comprehension. Letter recognition skills are the building blocks to a solid reading foundation.

The present invention contemplates provision of a teaching aid and a method of assisting students in the development of letter recognition and writing skills through the use of interdisciplinary units, materials with multiple uses and manipulatives that appeal to different senses and learning intelligences.

SUMMARY OF THE INVENTION

It is, therefore, an object of the present invention to provide a teaching aid apparatus that assists students in developing letter recognition skills.

It is another object of the invention to provide a system for teaching letter recognition and writing skills.

It is a further object of the invention to provide a method of teaching letter recognition and writing skills to beginner readers.

A still further object of the invention is to provide a kit that contains teaching aid blocks or units that are used in the application of the method of the instant invention.

These and other objects of the invention are achieved through a provision of a system having a kit of letter writing teaching aids. The kit comprises a plurality of template blocks, each block corresponding to a letter of an alphabet, each of said template blocks being provided with a cutout in the shape of a letter of the alphabet.

The kit also has an insert assembly comprising a plurality of insert members, each insert member forming a letter-building component adapted to be fitted in the cutout of a corresponding template block to form a letter of the alphabet. The kit further comprises at least a first set of letter cards, each card corresponding to a letter of the alphabet.

The letter cards are used to show a learner the image of the letter that the learner is asked to reproduce using three-dimensional insert, or by tracing the formed letter on paper, or by writing the letter in block form on a writing board.

BRIEF DESCRIPTION OF THE DRAWINGS

Reference will now be made to the drawings, where like parts are designated by like numerals, and wherein FIG. 1 is a perspective view illustrating positioning of the inserts into a template block corresponding to letter "j."

FIG. 2 is a perspective view illustrating positioning of the inserts into a template block corresponding to letter "u."

FIG. 3 a perspective view illustrating positioning of the inserts into a template block corresponding to letter "x."

FIG. 4 a perspective view illustrating positioning of the inserts into a template block corresponding to letter "c."

FIG. 8 is a plan view of a chalk board divided into four sections for illustrating right-left symmetry in static reversals ("p" and "q," and "b" and "d").

FIG. 9 is a perspective view-illustrating cue cards placed on a stand to assist in block building by the students.

DETAIL DESCRIPTION OF THE INVENTION

Figure 5:
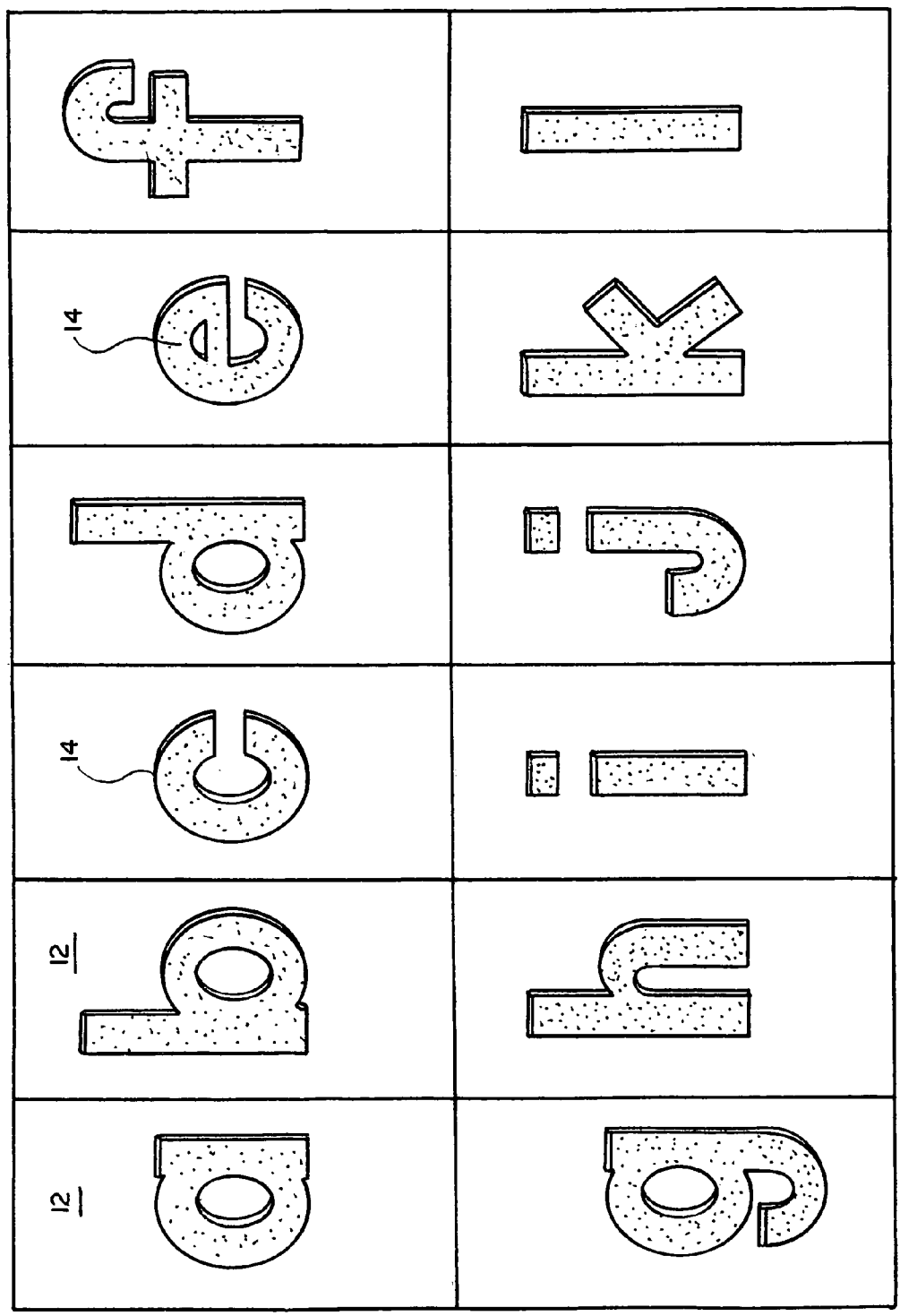
FIG. 5 illustrates a portion of the kit according to the present invention showing the template blocks for letters "a" through "l."
Figure 6:
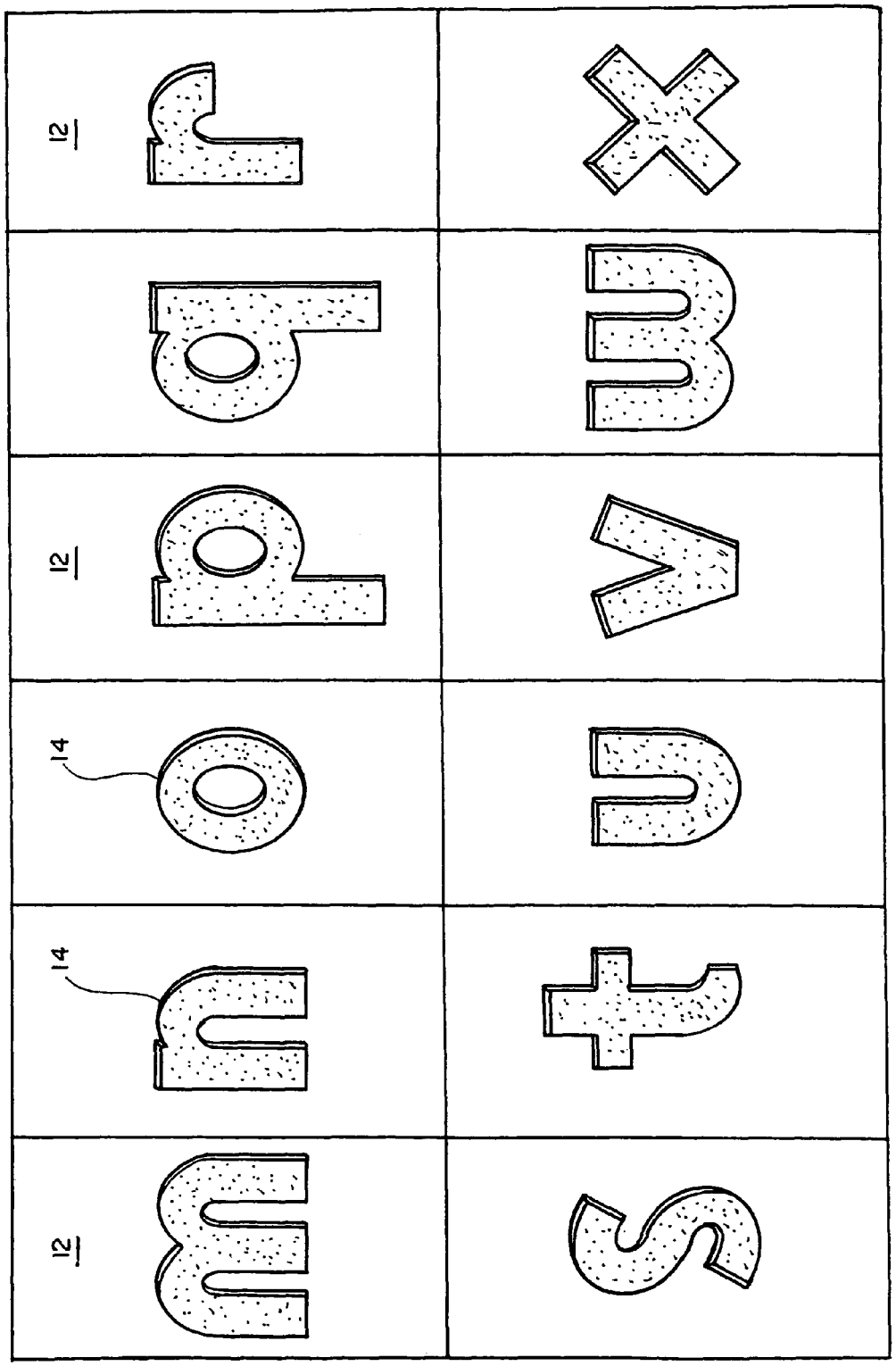
FIG. 6 illustrates a portion of the kit according to the present invention showing the template blocks for letters "m" through "x."
Figure 6A:
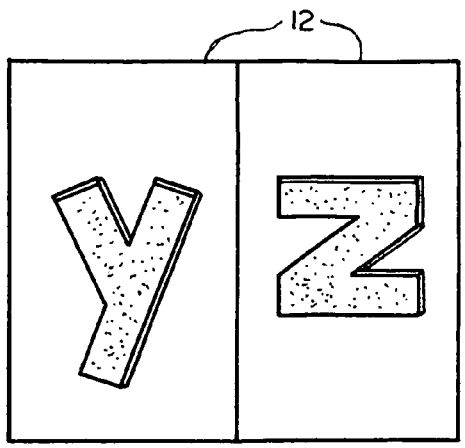
FIG. 6a illustrates a portion of the kit according to the present invention showing the template blocks for letters "y" and "z."
Figure 7:
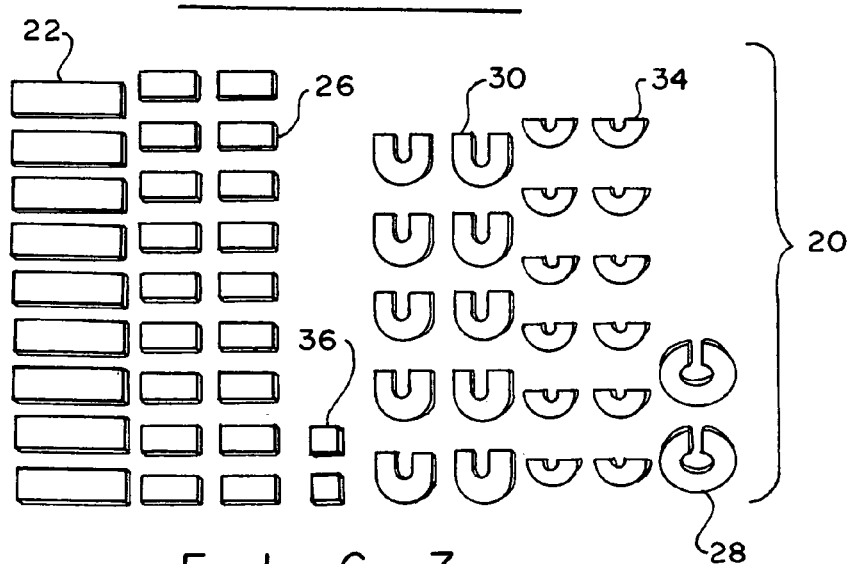
FIG. 7 is a perspective view illustrating the inserts that are included in the teaching aid kit of the present invention.

The direct aim in having students use the instant teaching aid and method is to teach students letter recognition skills through implicit instruction and student manipulation of the geometric shapes that make up each letter. There are two indirect aims for the letter recognition aid and method: the first indirect aim is pattern recognition, where students will be able to sharpen their skills in identifying patterns through manipulation of the geometric shapes. This is a skill that will not only be beneficial in future math courses, but will aid in a child's ability to recognize letter patterns in words when they begin to read. The second indirect aim is to promote students' use of geometry skills by using correct terminology of geometric shapes, and learning far in advance in a developmentally appropriate way about coordinates and manipulating shapes around and over an axis.

The use of the system blocks or units ("manipulatives") can benefit students' recognition of letters by creating a multi-sensory, interdisciplinary curriculum. Some components of geometry that can be associated with the shapes of letters include finding symmetry and building and identifying letters in different dimensions. A child can create letters in each of the three dimensions, and therefore be able to identify this letter in any printed form.

Traditionally, dimensions are taught in the upper elementary in relation to shapes. The teaching of shapes is not usually correlated with the shape of a letter. In the past, letters have been formally taught to students in one dimensional form. Students only encountered three dimensional forms of letters while informally playing with block letters, such as in puzzles. Students are rarely formally taught about two and three dimensional letters. By teaching students formally and informally about dimensions, this system and method give students another tool for letter recognition.

Turning now to the drawings in more detail, FIG. 1 through 9 illustrate the teaching aid kit of the present invention. The kit comprises a plurality of template blocks 12, each corresponding to a letter of the alphabet. In this example the kit contains twenty-six blocks 12 corresponding to the letters of the English alphabet. Each template block 12 is provided with a cutout 14, which forms a recess in the template and provides an outline of the letter.

The bottom wall 16 of the recess 14 has an aspect of different tactile quality than the remainder of the recess walls. In one exemplary embodiment, a piece of an abrasive material, for instance sandpaper, has been cut to correspond in shape to the shape of the bottom wall 16 and then positioned in the cutout 14 in a covering relationship to the bottom wall 16. Fine grit sandpaper can be used because it creates the most appropriate texture that would not harm a child's finger when using the letter templates. The purpose of using sandpaper inside the letter templates was to introduce the tactile sense to this manipulative. Students run their fingers along the sandpaper to trace the letter.

Of course, other materials may be used for covering the bottom wall 16. Preferably, the texture of the bottom wall is different than the texture of the other walls of the recess 14.

Some of the blocks 12 may have more than one cutout portions, such as for instance the letter "j" illustrated in FIG. 1. In that case, a smaller cutout 18 is formed above the main cutout 14 to accommodate a "point" of the letter "j." The template blocks 12 can be made of wood, plastic or other suitable material.

The kit further comprises an insert assembly 20 which comprises letter-building components and includes arcuate and straight insert members that are used to form the letters of the alphabet. In the exemplary embodiment shown in detail in FIG. 7, the insert assembly 20 comprises ten long straight rectangular-shaped members 22 and eighteen shorter straight rectangular-shaped insert members 26. The insert assembly 20 further comprises two C-shaped arcuate members 28, ten U-shaped arcuate insert members 30 that have radii smaller than the arcuate insert members 28. The kit also comprises twelve U-shaped arcuate members 34 that have radii smaller than the C-shaped insert members 28 and smaller than the U-shaped arcuate insert members 34.

The rectangular-shaped insert member 22 is longer; it can be used to form the vertical components of the letters "p," "t" and others. The shorter insert members 26 can be used to form such letters as "z," "x" and others.

The arcuate insert member 28 has the largest radius of curvature; it can be used to form the curved components of such as letters as "c" and "e." The arcuate insert member 30 has a smaller radius of curvature; it can be used to for the letter "u," as well as parts of the letters "b," "d," "q," n," "h." The smallest arcuate member 34 may be used, for instance, in forming the bottom parts of the letter "j", as well as for forming letters "o" and "s" and others.

The kit also comprises two "dot" insert members 36 can be either rectangularly-shaped or disk-shaped. The insert member 36 can be used to form a "dot" of such letters as "i" and "j."

Each insert member is formed as a solid body having specific pre-determined thickness that is less or equal to, the depth of the cutouts 14. When positioned in the cutouts 14, the insert members may overlap and not necessarily fit into the corners of the cutouts. As the drawings illustrate, the rectangularly-shaped insert members do not have to have a beveled or slanted corners that would be necessary for a "perfect" fit in the cutouts 14. As long as the general shape of the letters is followed using the insert members of the insert assembly 20, the student can learn the basic letter-shaping lessons. Of course, if desired, the rectangularly-shaped, or parallelepiped-shaped insert members may be provided with end portions cut at an angle for a better fit in the cutouts 14, if desired.

Each insert member has a bottom surface 40 that is covered with a soft flexible material, such as fabric. The fabric layer 42 protects the insert body from contact with the abrasive or textured bottom wall 16 of the cutout 14. Additionally, the students manipulating the insert members have another tactile experience when touching the insert members when compared to the template blocks 12.

In one exemplary embodiment, the dimensions of each template block 12 were ¾"×5½"×2½". The thickness of the template block 12 was ¾ of an inch. The letter templates were 5½" tall and 2½" wide. The shape of the letter was carved into the center of the template blocks. The template blocks 12 were made of wood. The insert members of the insert assembly 20 were sized and configured to fit into the cutouts 14. The insert members were made out of basswood. The dimensions of the basswood used to carve the arcuate insert members were 3/16"×3"×24". The straight insert members and the "dots" were cut from small board of basswood. The dimensions for the second basswood board are 3/16"×½"×24". Of course, other sizes of the template blocks and the letter-building components (insert members) can be used, depending on the designer's selection.

In one exemplary embodiment, the insert members were painted a color instead of being stained so that they would stand out in contrast to the template blocks, in which they will be placed. Therefore, when the student using the letter recognition manipulative recalls the image of the letter template with the insert member placed inside, he or she will not be confused because the letter itself will stand out in color.

The kit of the present invention may also include a writing board 50 formed as a grid chalk board, which may be used to assist students in learning symmetry using the example of static reversals. As shown in FIG. 8, the chalk board 50 can be divided into four sections 52, 54, 56, and 58. A student is instructed to form a letter "p" using the straight and the arcuate insert members, and then a symmetrical reversal, the letter "q" may be formed in the section 54 using the template blocks for guidance, while forming the letter using the insert members.

Similarly, an outline of the letter "b" is presented to the student by using the template block corresponding to that letter. The student is instructed to use an arcuate insert member and a straight insert member and form the letter "b" in the section 56. Using the symmetrical rules, the student can then form the letter "d" using the arcuate and the straight insert members in the section 68. The quadrants, or sections of the board 50 are separated by the x- and y-axis. The advantage of using the board 50 is that students can manipulate letter shapes through reflections, rotations, and translations on the coordinate plane.

The kit of the present invention further comprises a card stand 70 and a set of pre-printed letter cards 72, each letter card 72 corresponding to a letter of the alphabet. The stand 70 comprises a frame 74 and a horizontally-oriented support 76 having a groove 78 formed in its upper surface. The support 76 is affixed to span across the frame 74, while being secured to the sides of the frame 74. The support 76 is configured to support one or more cards 72 in a substantially upright position relative to a horizontal surface.

In the first step of the method of the present invention, the child would start by placing the letter cards 72 for the particular letter he/she is working on in the card stand 70 (FIG. 9). The child would take out the template block 12 that corresponds with the letter and place it on the rug or table in front of them. Since the inside of the template has a different texture, the child will trace the bottom wall 16 with his or her finger. The child uses this tactile sense and the picture to form the letter. From the given picture, or from shape manipulation, the child will take out the insert members For instance, to form the letter "j," the child will select the insert member 22, an arcuate member 34 and the "dot" insert member 36.

The child then fits the inserts 22 and 34 into the cutout 14, using tactile/visual/logical discrimination or trial and error. The teacher presenting this to the child will show that he or she has now made the letter in a three dimensional form.

The teacher would discuss the name of the letter and the sounds that it can make. The child would repeat these sounds and identify the letter. For example, the teacher might show the child a card with the letter "b" on it and say "this is the letter "b", the sound for the letter "b" is /b/." The teacher may discuss with child the definition of a three dimensional object and where it is that we see letters in a three dimensional form, such as in blocks and toys.

In the second step of the process according to this invention, the child places the letter shape that they have made from the insert members onto a piece of paper. Next, the child traces the shape with a pencil creating a written form of the letter, in block form. The teacher presenting the materials to the child would explain to the child that he or she has now made the letter in a two dimensional form. Again, the child would say the name of the letter and the sounds that the letter makes. The teacher may discuss the definition of a two dimensional object with the child and generate examples of where we see letters in a two dimensional form, such as in signs and billboards.

In the third step, the child will write a letter using a first set of cards 72, each of the cards carrying pre-printed indicia corresponding to a letter of the alphabet. The student uses the pre-printed cards 72 as examples of writing a letter. The child will do this by first placing the letter card 72 in the card stand 70. Then, with the teacher's direction, the child will create a one-dimensional form of the letter by copying the letter card and writing the letter on a sheet of paper with pencil. Once again, the child will read the letter he/she has written and give possible sounds of the letter. The teacher should explain the definition of a one-dimensional drawing and generate examples of where we see letters in one-dimensional form, such as in books and newspapers.

Figures 10, 11, 12:
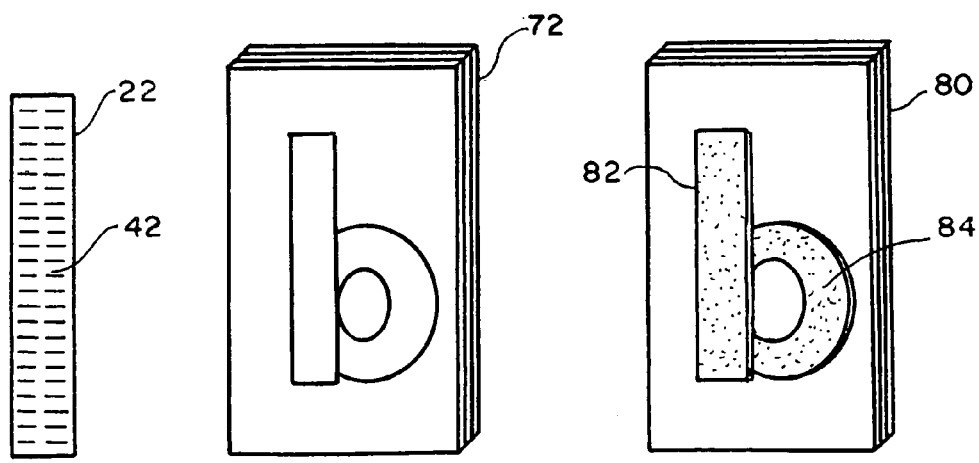
FIG. 10 is a bottom view of an insert showing a protective layer on the bottom of the insert.
FIG. 11 is a perspective view illustrating a second set of cards included in the kit of the present invention.
FIG. 12 is a perspective view illustrating a set of letter cards showing segmented letter building.

Alternatively, the third step may be conducted using a second set of cards 80, which are pre-printed with the images of the letters of the alphabet formed by the letter-building components corresponding to one or more of the insert members. The image printed on the cards 80 can be color-coded to correspond to the color coding of the insert members of the insert assembly 20. As can be seen in FIG. 12, the letter "b" is pre-printed using two letter-building components—a straight rectangular shape 82, which generally corresponds to the insert member 22 and an arcuate portion 84, which generally corresponds to the arcuate insert member 30.

Once students have moved through the entire alphabet and the teacher feels confident that the child has mastered the ability to create the letter in all three forms, the child can move on to the final stages of the material. In the fourth step, the child will be introduced to the idea of symmetry. The teacher can have the student take the one or two dimensional letters that they have written on a piece of paper to manipulate for symmetrical purposes.

In some cases, the student may benefit from cutting out the letters so that they are easier to manipulate. The teacher will guide the child in sorting the letters to create two categories. The first category included those letters that have symmetry. At this point, students must only recognize that a letter has at least one line of symmetry. The second category the students create includes those letters that have no lines of symmetry. From this point, the teacher may choose to create more difficult categories once the student has a firm understanding of the subject. For example, the teacher may have the student split the "have symmetry" category into letters that have only one line of symmetry, and a category for those letters that have more than one line of symmetry, and so forth.

In the fifth and final step of using the instant method, the student will need to use the second set of cards 72, the chalk, and the grid chalk board 50 (coordinate plane). This step would only take place after a child has mastered the identification of lower-case letters. Once this prerequisite has been established, the teacher will give a presentation on the quadrants of a coordinate plane (52, 54, 56, and 58). The teacher will explain the x-axis and y-axis and how a shape can be rotated, translated, reflected, and transformed. Depending on the child's ability, the teacher may also want to teach the child how to move clockwise and counterclockwise.

The child will choose a card from the pile and follow the directions on the card. If needed, the child may use the insert members to create and manipulate the letters. For example, the card may say "Make the letter b in quadrant III" (section 56). The child will then create the letter "b" using chalk somewhere in quadrant III. The directions may say "Now flip the letter b over the y-axis". The child will flip their letter over the y-axis. The next question might ask "What letter did you make?". Once the letter b is flipped over the y-axis, the letter "d" should have been formed. The card may also ask, "Which quadrant is this new letter in?" The child should answer, "Quadrant IV" (section 58). The teacher may choose to have the student answer the questions verbally or write them down. The goal of step four of this material is for children to realize that letters can be manipulated into other letters and this will help their pattern and letter recognition skills.

The kit of the present invention forms a visual manipulative, allowing the student to see the shapes that can be manipulated into a puzzle-like from through the use of the template. The manipulative is tactile and kinesthetic because the child can physically touch and manipulate the pieces with their hands to discover which pieces fit best.

The tactile properties of the kit members are enhanced by the use of different texture material, such as fine sandpaper in the bottom of the cutout 14. The child can run his/her finger through the template and feel the shape of the letter. This manipulative can also be used as an aid for the auditory sense, because while the child is using the materials, he/she must also hear the name of the letter and its possible sounds from the teacher, and then repeat the name and sounds out loud. Finally, insert pieces assist the student in developing the chromatic sense because the insert member have different colors than the template blocks 12, which helps the child distinguish between pieces.

The system and method of the invention assist in the child development by teaching letter recognition, a key part of the learning language. A student with linguistic intellect would benefit from using this system because the goal of the system is to learn letters in the alphabet. The system and method would provide the basic skills of language that would translate into the basis for the student's language and writer career later on in life.

The method also has a verbal component, through which the child recites the name of the letter and the possible sounds that the letter can make. The Linguistic intelligence is often called "Verbal/Linguistic intelligence" because the two areas are so closely related within a person with Linguistic intellect. Therefore, the benefits of this system for a verbal/linguistic student are vast given the linguistic goal and the verbal component the system possesses.

The student using the system is in constant motion by putting the geometric shapes (line, arc, and point) into the letter template. If the child cannot fit the shape into the template blocks correctly, the brain must then signal a change to the body. The constant motion of the intellectually bodily/kinesthetic student, paired with the physically requirement for manipulation of the shapes into a template, makes the system a key tool in aiding a bodily/kinesthetic student with letter recognition.

In the inventor's research on the subject of letter recognition, many studies were found that involved students with special needs, especially students with dyslexia. It is believed that the instant system would assist special needs students by promoting letter recognition.

The skills linked with this system involve both literacy and mathematics, which are key components and focuses of today's educational reform and policy. Most importantly, the use of this system creates a cohesive bond between knowledge and play, allowing students to enjoy learning, and therefore become more invested in their education and ultimately perform better on high stakes tests.

Many changes and modifications can be made in the system and process of the present invention without departing from the spirit thereof. I therefore pray that my rights to the present invention be limited only by the scope of the appended claims.

I claim:

1. A kit of letter writing teaching aids, comprising:
    a plurality of template blocks, each block corresponding to a letter of an alphabet, each of said template blocks being provided with a cutout in the shape of a letter of the alphabet;
    an insert assembly comprising a plurality of insert members, each insert member forming a letter-building component adapted to be fitted in the cutout of a corresponding template block to form a letter of the alphabet,
    at least a first set of letter cards, each card corresponding to a letter of the alphabet; and
    a writing board formed by a grid chalk board and divided by x and y coordinates into distinct sections.

2. A method of teaching a learner to write letters of an alphabet, comprising the steps:
    providing a teaching aid kit comprising a plurality of template blocks, each block corresponding to a letter of an alphabet, each of said template blocks being provided with a cutout in the shape of a letter of the alphabet, an insert assembly comprising a plurality of insert members, each insert member forming a letter-building component adapted to be fitted in the cutout of a corresponding template block, and at least a first set of letter cards, each card corresponding to a letter of the alphabet;
    selecting one template block and asking the learner to trace the cutout in the selected template block with learner's fingers;
    asking the learner to select insert members necessary to form a letter corresponding to the letter defined by the cutout of the template block;
    asking the learner to place the insert members in the cutout and form the letter of the alphabet;
    asking the learner to remove the insert members from the cutout and trace the formed letter on paper; and
    asking the learner to write the letter of the alphabet in block form.

3. The method of claim 2, further comprising the step of instructing the learner on the name and sound of the letter formed by the cutout in the selected template block, before asking the learner to select the insert members.

4. The method of claim 3, further comprising the step of asking the learner to repeat the name and sound of the letter formed by the insert members.

5. The method of claim 2, further comprising a step of providing a stand for supporting the letter cards in a generally upright orientation.

6. The method of claim 2, further comprising the step of providing a writing board divided into sections by x and y coordinates and instructing the learner in basic symmetry concepts.

7. The method of claim 6, further comprising a step of asking the learner to write a letter of the alphabet in one section of the writing board and asking the learner to write a static reversal of the letter written in the one section in a section opposite the one section.

8. The method of claim 2, further comprising the step of providing the insert members colored in distinct colors.

9. The method of claim 8, further comprising a step of providing a second set of cards, each card corresponding to a letter of the alphabet formed by the colored insert members.

10. The method of claim 2, wherein said insert members comprise a plurality of straight members and a plurality of arcuate members.

11. The method of claim 10, wherein said insert assembly comprises a plurality of different length straight members and a plurality of different radii arcuate members.

12. The method of claim 2, further comprising a step of forming a bottom wall in each of said cutouts and positioning an abrasive material on said bottom wall.

13. The method of claim 12, wherein said abrasive material is sandpaper.

14. The method of claim 2, wherein each of said insert members has a bottom surface and wherein a protective layer is secured on said bottom surface.

15. The method of claim 14, wherein said protective layer is formed of fabric.

* * * * *